July 17, 1928.
W. F. SHORT
1,677,150
COMBINATION AIRPLANE AND ZEPPELIN
Filed Feb. 1, 1928     2 Sheets-Sheet 1
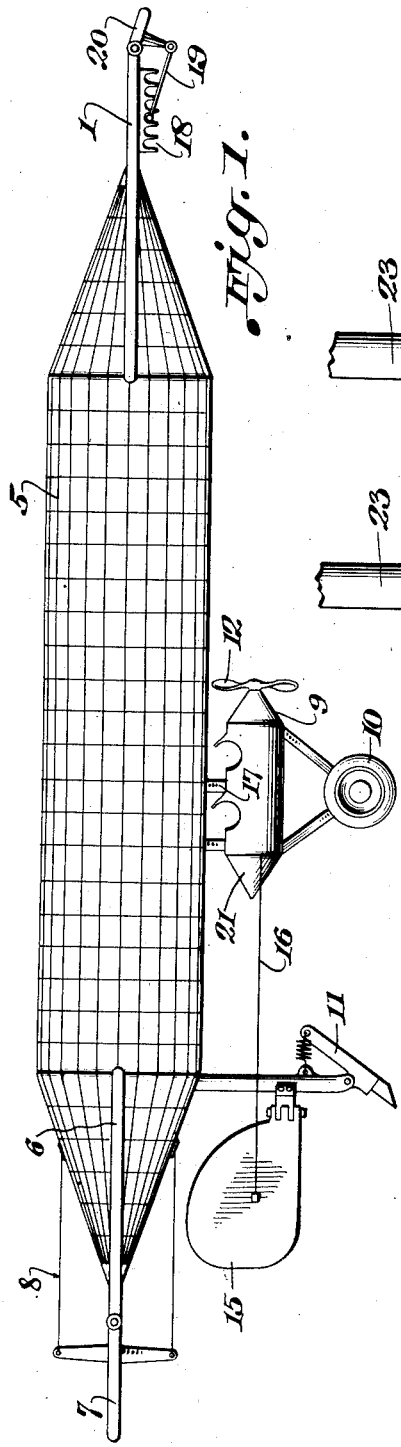
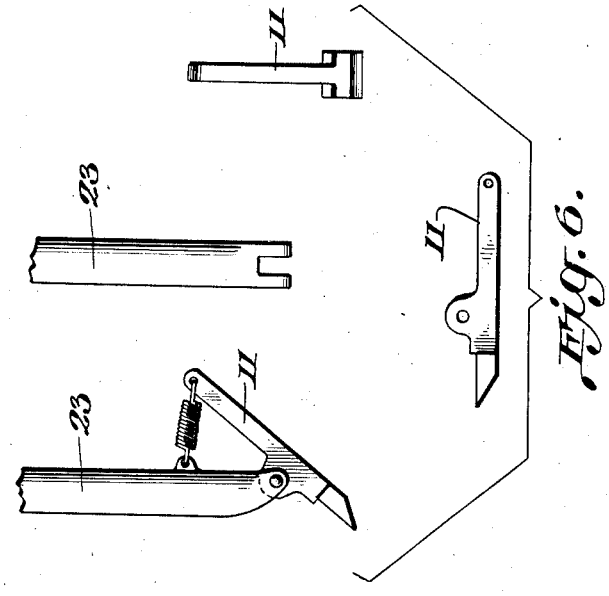
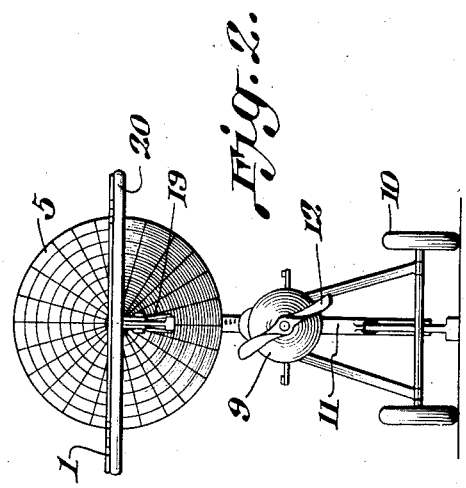
Inventor:
Wayne F. Short July 17, 1928.
W. F. SHORT
1,677,150
COMBINATION AIRPLANE AND ZEPPELIN
Filed Feb. 1, 1928   2 Sheets-Sheet 2
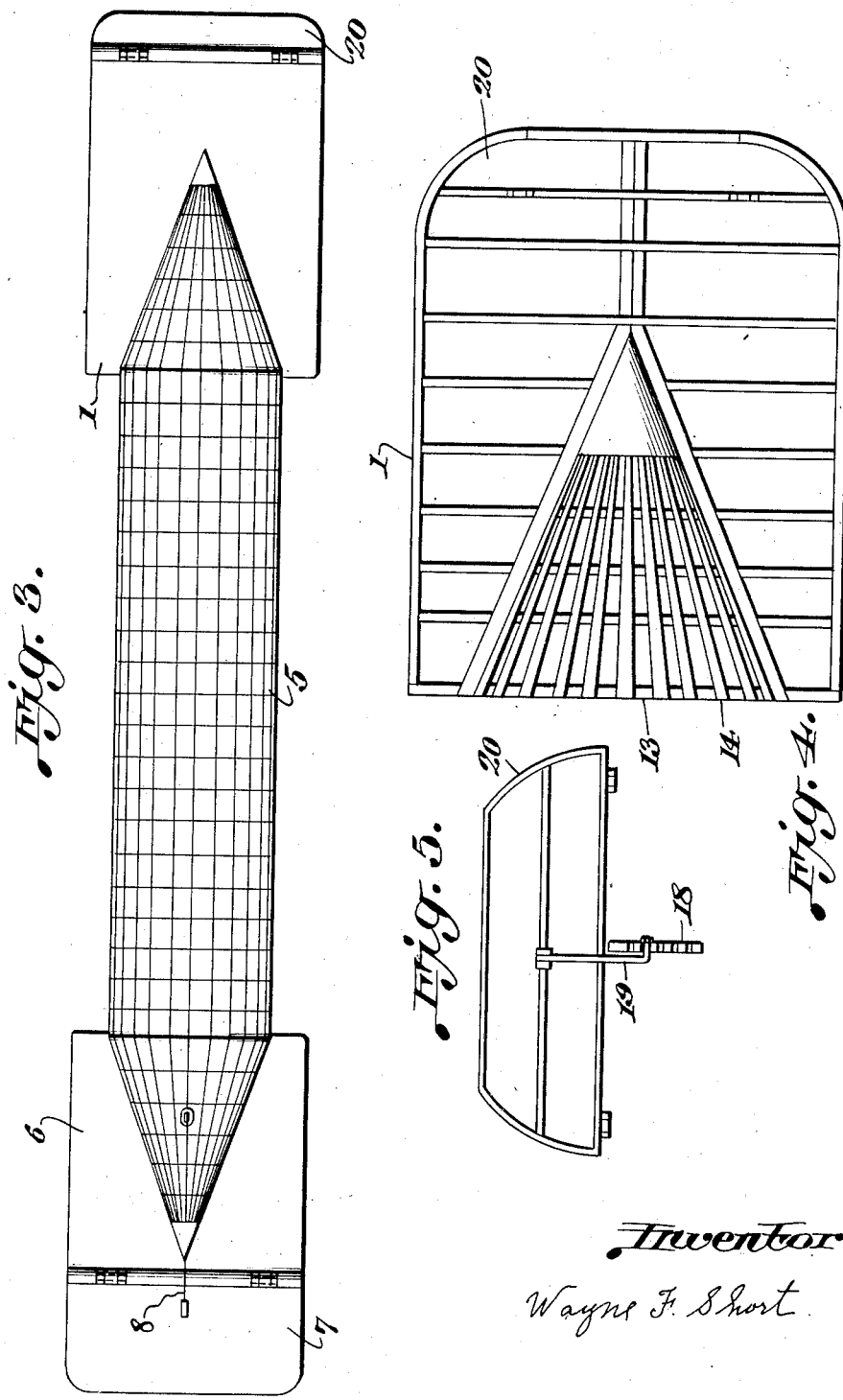
Inventor:
Wayne F. Short.

Patented July 17, 1928.

1,677,150

UNITED STATES PATENT OFFICE.

WAYNE F. SHORT, OF BLOOMINGTON, INDIANA.

COMBINATION AIRPLANE AND ZEPPELIN.

Application filed February 1, 1928. Serial No. 251,205.

The object of this invention is to combine the features of an airplane and zeppelin in such a way that the resulting machine will have the desirable features of both and others besides. The advantages of such a machine are that it eliminates practically all danger from engine trouble and landing. An inexpensive low power engine can be used as well as a high power one, it is simple to control and after altitude has been attained the machine can stay aloft in the wind without engine power and it can land and rise in a very small space. The machine when handled without engine power will have all of the flying faculties of a turkey buzzard.

In referring to the accompanying drawings. Fig. 1 is a side view of the whole machine, Fig. 2 is a top view of the same, Fig. 3 is a top view of the same, Fig. 4 is a top view of the front wing surface, Fig. 5 is a bottom view of the front flap or drift controller. Fig. 6 is a view showing the details of the landing pin or skid. The machine consists of a gondola 21, with two wheels 10, attached to a rigid gas bag 5. The gas bag has two similar tapering ends, the tapering part is partially surrounded by flat surfaces which serve to buoy up the machine when in motion. The front wing surface has a small adjustable flap 20 which can be set at an upward or downward angle by means of the hooked rod 19 which fits into the rack 18 and is held in place by a bolt or pin. The rod 19 is pivoted to a lever arm on the flap. The rear wing surface is the same size as the front one and has a flap 7 controllable from the gondola by means of the cables 8 which lower or elevate it causing the machine to move accordingly. The side motion mechanism is a rudder 15 controllable from the gondola and located on a shaft 23 connected to the gas bag structure, this shaft is provided with a landing pin 11 with spring attachment.

The gondola is located so that the engine is at the center of the gas bag and the load is carried in rear of the center and wheels which makes landing and rising easy with or without the use of the tail flap. The gas bag content is to be adjusted depending on the kind of engine used and the time of rising desired.

Modern zeppelins are made of an aluminum alloy as strong as steel, the framework consists of polygons with girders on the sides. The polygons are braced from the inside by wires running to a circular support, the ballonets are of a rubber composition with gold-beater's skin lining which makes diffusion loss very small.

It is reasonable to believe that with the largest size gas bag equipped with wing surfaces a very large load could be carried with more safety than with the lighter-than-air machines. The interior of the wing surfaces could be used for berths, the engines could be located on top of the front wing surface and underneath on the rear one, the front engines pulling and the rear ones pushing or pulling. It is also apparent that the gas bag could be made hollow and the wing surface extend inside the bag and outside also. In a small ship the engine could be located in the center of the gas bag with a gondola underneath but due to air resistance and increased size a hollow bag would not be as suitable for a single engine machine as the one described in this invention.

Claim:

In an airship, two wing surfaces one at each end of a rigid gas bag, a front end flap connected to the front wing surface, a rudder pivoted to a shaft, said shaft being connected to the framework of the gas bag and carrying a landing pin, a vertical motion flap located at the rear end of the structure and connected to the rear wing surface, a gondola connected to the gas bag framework and to which two wheels are attached for landing purposes.

In testimony whereof I affix my signature.

WAYNE F. SHORT.